No. 842,746. PATENTED JAN. 29, 1907.
J. B. AMOS.
EXCAVATOR.
APPLICATION FILED SEPT. 22, 1906.
2 SHEETS—SHEET 1.
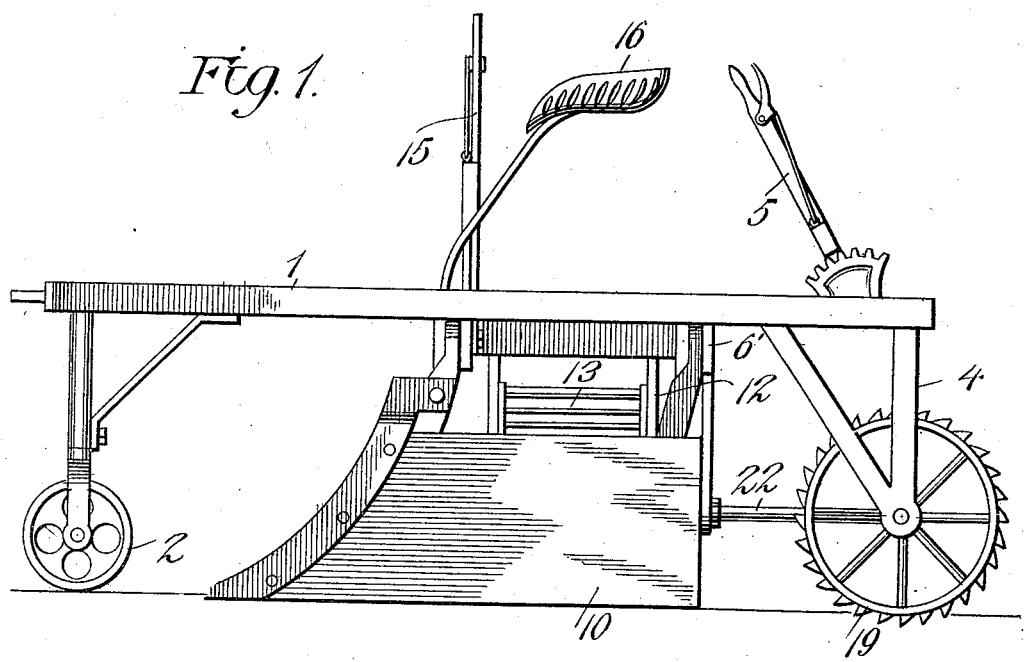
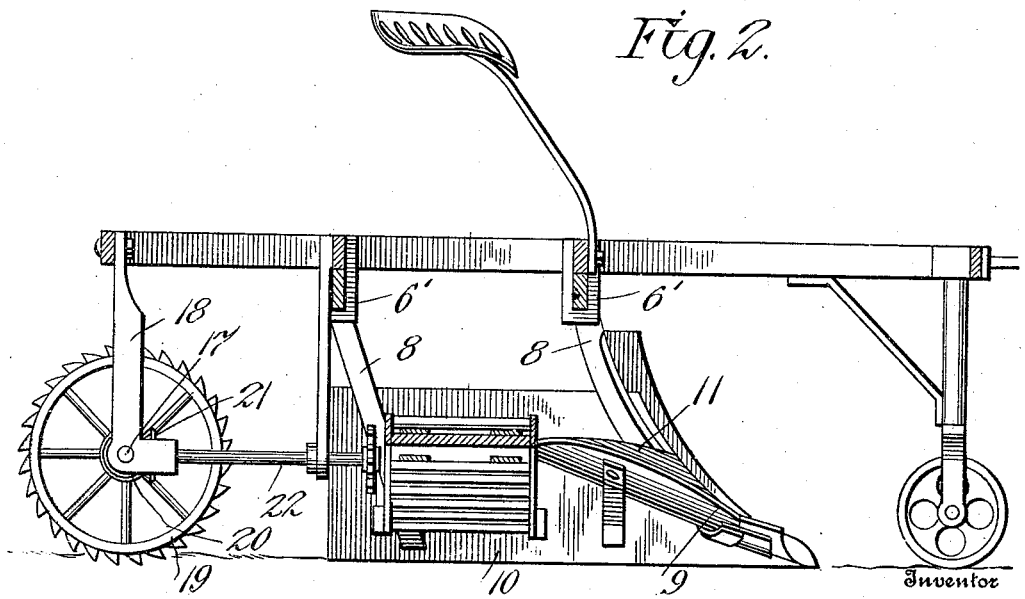
Witnesses
Geo. Ackman Jr.
C. C. Hines
Inventor
John B. Amos,
By Victor J. Evans
Attorney No. 842,746. PATENTED JAN. 29, 1907.
J. B. AMOS.
EXCAVATOR.
APPLICATION FILED SEPT. 22, 1906.

2 SHEETS—SHEET 2.

Witnesses
Geo. Ackman Jr.
C. C. Hines

Inventor
John B. Amos
By Victor J. Evans
Attorney

UNITED STATES PATENT OFFICE.

JOHN B. AMOS, OF PRAIRIE CITY, ILLINOIS.

EXCAVATOR.

No. 842,746.　　　　Specification of Letters Patent.　　　　Patented Jan. 29, 1907.

Application filed September 22, 1906. Serial No. 335,799.

*To all whom it may concern:*

Be it known that I, JOHN B. AMOS, a citizen of the United States, residing at Prairie City, in the county of McDonough and State of Illinois, have invented new and useful Improvements in Excavators, of which the following is a specification.

This invention relates to improvements in ditching or excavating machines designed, primarily, for forming irrigating-ditches and preparing old ditches of this character for use, the main object of the invention being to provide a simple form of implement which will effectually cut the ditch and convey and discharge the earth removed in the production thereof at one side of the machine and in which the operating parts are adjustable laterally to suit different conditions of service and to secure evenness of draft without varying the position of the draft connections.

The principles of the invention, however, may be effectually employed in single or gang plows when the capability of lateral adjustment of the shafts is desired.

Figure 3:
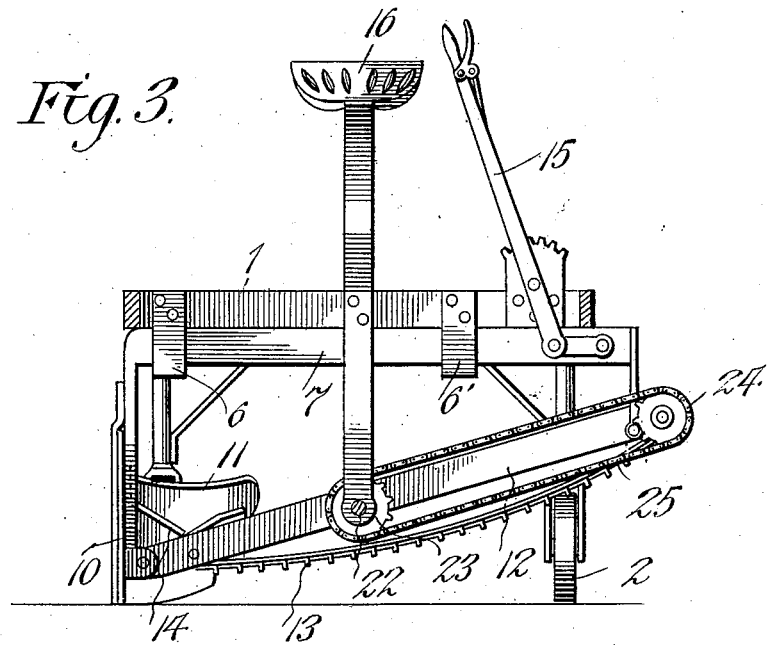
Figure 4:
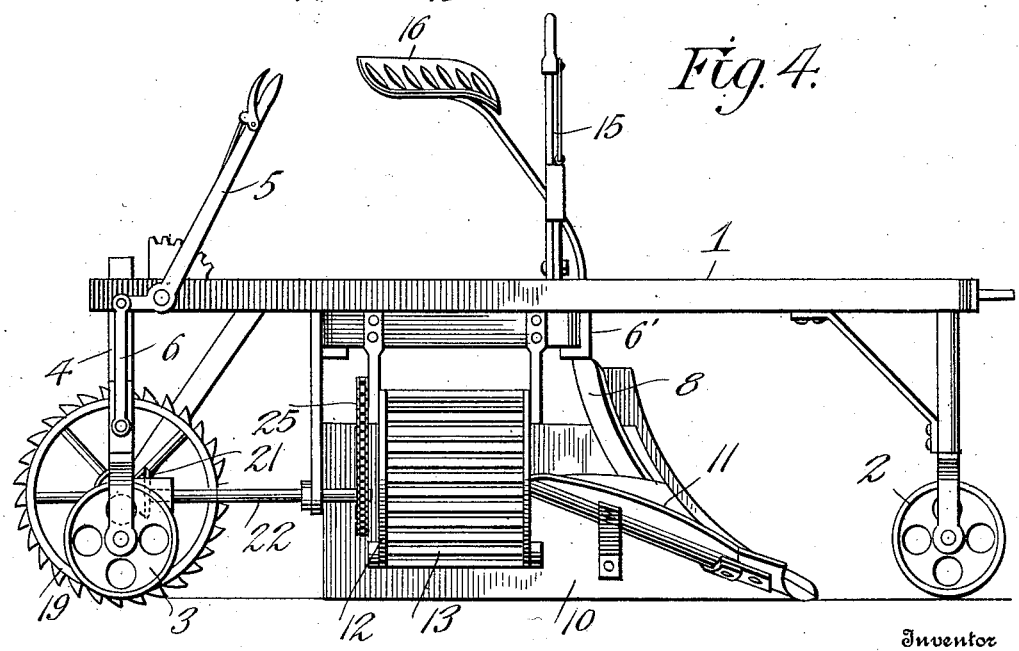

In the accompanying drawings, Figure 1 is a side elevation of an excavator embodying my invention. Fig. 2 is a longitudinal section of the same. Fig. 3 is a cross-section. Fig. 4 is an opposite side elevation.

Referring to the drawings, the numeral 1 designates the main frame of the implement, which may be of any preferred construction and is supported at a desired elevation upon front and rear carrier-wheels 2 and 3, which may be in the nature of caster-wheels to enable the implement to be conveniently steered. The rear wheels 3 are carried by standards 4, which are vertically adjustable on the main frame, and may be raised or lowered by means of levers 5, connected therewith by links 6, by which the main frame may be tilted to regulate the depth of penetration of the share or excavating-shovel. These levers may be locked in adjusted position by the usual type of locking mechanism. Of course a single lever may be employed for simultaneously adjusting both rear wheels.

The main frame is provided with guides 6', receiving and supporting the laterally-shiftable frame 7, arranged approximately at the center of and beneath the main frame. This frame 7 is provided at one side with hangers 8, supporting an excavating-shovel or digger 9 and a landside, board, or plate 10. The moldboard 11 of the excavating-shovel is of novel form, being scoop-shaped to take up and guide the earth rearwardly, thus forming an earth-conveyer. The supplemental frame also carries a conveyer 12, comprising a frame having shafts around which pass an endless conveyer belt or apron 13, the lower end of said conveyer being arranged immediately in rear of the shovel and the conveyer then extending on an upward inclination toward the opposite side of the frame. It will be seen that the shovel is arranged at one side of the implement, a chute or deflector 13 being arranged in rear of the moldboard to catch and guide the dirt dropping therefrom onto the lower end of the conveyer, the latter discharging the earth at one side of the machine at a suitable distance away from the ditch. The frame 7 is operatively connected with a lever 15, by which it may be conveniently adjusted by the driver occupying the seat 16.

An axle 17 is supported at the rear of the machine in depending brackets 18 and carries a drive-wheel 19, spurred or stepped to engage the ground-surface. A bevel-gear 20 on this wheel meshes with a corresponding gear 21 on a longitudinal shaft 22, journaled upon the main frame, said shaft carrying a sprocket-wheel 23, connected with a corresponding wheel on the upper shaft of the conveyer by a chain 25, whereby the conveyer is driven when the implement is in motion.

In operation the implement is drawn forward by one or more draft animals hitched to the forward end of the frame on the landside, and the shovel 9 operates to excavate the soil and form the ditch, the earth being discharged rearwardly onto the conveyer and deposited by the latter on the surface of the ground at the opposite side of the machine. By means of the lever 15 the shovel and conveyer may be shifted laterally of the main frame to secure evenness of draft in accordance with the number and arrangement of the draft-animals, thus obviating the necessity of shifting the clevis or draft connection.

As stated, the principle of the invention may be used in plows for general agricultural work when it is desired to secure lateral adjustability for the purpose set forth or to throw the earth at any considerable distance from the furrow.

Having thus described the invention, what I claim is—

1. An implement of the character described comprising a main frame, a carrier-frame laterally adjustable on the main frame, and a digger supported by the carrier.

2. An implement of the class described comprising a main frame, a carrier-frame laterally adjustable on the main frame, a transverse conveyer supported by the carrier-frame, means for operating said conveyer, and a digger arranged to discharge the earth taken up thereby on the carrier.

3. An implement of the character described comprising a main frame, a carrier-frame laterally adjustable thereon, a transverse conveyer supported by the carrier-frame, means for operating said conveyer, and an excavating-shovel carried by the carrier-frame and having a channeled moldboard arranged to convey the earth to the conveyer.

4. In an implement of the character described, a conveyer, a shovel having a moldboard of channeled form to conduct the earth thereto, and means for shifting the shovel and conveyer in unison.

5. An implement of the character described comprising a main frame, a carrier-frame laterally adjustable thereon, an excavating-shovel having a channeled moldboard, a transverse conveyer adapted to receive the earth from the moldboard, a drive-wheel, and gearing for driving the conveyer from the drive-wheel.

In testimony whereof I affix my signature in presence of two witnesses.

JOHN B. AMOS.

Witnesses:
LAURENCE EYMAN.
JOHN W. MOORE.